Patented Mar. 1, 1927.

1,619,649

UNITED STATES PATENT OFFICE.

LEONARD HUGH BONNARD, OF LONDON, ENGLAND, ASSIGNOR OF ONE-HALF TO ALFRED HENRY BONNARD, OF LONDON, ENGLAND.

MANUFACTURE OF VEGETABLE CARBON.

No Drawing. Application filed October 8, 1925, Serial No. 61,329, and in Great Britain August 4, 1925.

This invention is for improvements in or relating to the manufacture of vegetable carbon and has for an object to provide a carbon which is particularly effective in purifying, clarifying, or sterilizing liquids or solutions; that is to say the carbon may be used for such purposes as the refining of sugar, the clarifying of oils and the removal of bacteria and the like from liquids.

According to this invention a process for the production of vegetable carbon consists in intimately mixing carbonaceous material of vegetable origin (for example disintegrated woody materials like sawdust) with a salt of magnesium, heating the mixture so as to carbonize the carbonaceous material and thereafter treating the product to separate the carbon therefrom. The salts of magnesium employed are calcinable salts. That is to say, they are not volatile or fusible under the temperatures employed in carbonization and preferably a salt such as hydrated magnesium carbonate is used which results in a product containing magnesium oxide.

After the heat treatment the product is treated to separate the carbon therefrom. The mixture of carbonaceous material of vegetable origin and hydrated magnesium carbonate should be introduced into the retort in a dry state. That is to say free water should be evaporated therefrom, if present, because otherwise the production of distillates (which can be recovered) from the carbonaceous material is injuriously affected.

The intimate mixing of the hydrated magnesium carbonate with the carbonaceous material may be facilitated by the presence of a quantity of water sufficient to conduct the hydrated magnesium carbonate into the capillary passages of the carbonaceous material and the mixing may be further facilitated by agitation in a ball mill, edge runner mill or the like.

According to this invention a process for the production of vegetable carbon comprises the formation of the carbon with intimately mixed magnesium oxide, the conversion of the magnesium oxide to magnesium bicarbonate in the presence of sufficient water to dissolve it, and the separation (for example by filtration) of the resulting solution from the carbon.

The separated solution of magnesium bicarbonate may be heated so as to precipitate a proportion or whole of the magnesium content as hydrated magnesium carbonate which may be used again for treating the carbonaceous material. It will be seen that this process enables the by-products to be recovered and enables the activating agent to be extracted and recovered in a form suitable for re-use.

In order that the bulk of water for use in the process may be kept as small as possible and in order to reduce the time taken for dissolving the magnesium carbonate in the water and the time for precipitating out the hydrated magnesium carbonate, advantage is taken of the effect of pressure and temperature upon the solubility of these two salts. Their solubility is found to be proportional to the static pressure of the water and inversely proportional to its temperature.

The time taken for dissolving and precipitating the salts respectively is likewise affected by pressure and temperature. Since however the solubility of the salts and the time taken for dissolving and precipitating them are not directly proportional to the pressure employed, there are certain limits beyond which it is not economical to work.

In one method of carrying out the process according to this invention the magnesium bicarbonate formed in the carbon is dissolved in water at a suitable high pressure (for example 8 atmospheres) and a suitable low temperature (for example atmospheric temperature) and after the resulting solution has been separated from the carbon the hydrated magnesium carbonate is precipitated out by heating the separated solution to a higher temperature (for example 30° C.) and at a lower pressure (for example atmospheric pressure). The precipitation of the hydrated magnesium carbonate may be further accelerated by submitting the separated solution to a vacuum with or without application of heat.

It has been found that if the temperature of the solution of magnesium bicarbonate is maintained not substantially higher than 22° C. there is time to separate the solution from the carbon at atmospheric pressure before the hydrated magnesium carbonate commences to precipitate out.

If, however, magnesium bicarbonate solution is formed at a temperature substantially higher than 22° C. the solution should be separated from the carbon while still under pressure, and the hydrated magnesium carbonate precipitated out by the reduction of pressure on the separated solution.

The following is a description by way of example of one method of carrying this invention into effect. 100 parts by weight of ordinary sawdust which would pass through meshes of one-twentieth of an inch wide (10. I. M. M.) are mixed with 100 parts by weight of hydrated magnesium carbonate and 100 parts by weight of water, which water is absorbed by the sawdust and hydrated magnesium carbonate to such an extent that the mixture will run through the fingers without leaving any water thereon. The materials are mixed in a ball mill, edge runner mill or the like to ensure intimate mixture, or in other words to work the hydrated magnesium carbonate into the sawdust particles. It would appear that the movement of the water in the capillary passages of the sawdust, which is brought about by the action of the mill, results in the introduction of the hydrated magnesium carbonate into the capillary passages. The agitation in the mill may be conveniently carried out for about ten minutes.

The mixture is then dried by any convenient means. It is then introduced into a retort of any convenient form, preferably that described in United States Patent No. 1,499,850.

The temperature of the charge is then gradually raised to about 1000° C. (preferably not less than 1000° C.). Using the furnace described in Patent No. 1,499,850 with quarter inch layers, the operation of heating the mixture to about 1000° C. takes about four minutes. After that stage the same temperature is still maintained for a further period, in this case about five minutes. During this period the carbonization is completed and gases cease to be evolved, but the heat is maintained as it is found that a more highly porous product results than if the heating is discontinued as soon as the gases cease to come away. During the process of heating, the products of destructive distillation of the carbonaceous material are cooled and condensed in any well known way.

In order to produce the desired results, it is important that the necessary high temperature should be imparted to every particle of the mass for the time stated, and the means employed should be adequate for this purpose.

After the heat treatment the mass is allowed to cool and the resulting magnesium oxide is separated from the carbon by any of the following methods or by a combination of them.

The following is an example of one method of separating the magnesium oxide from the carbon:

The carbon and magnesium oxide mixture from the retort has water of approximately forty times the weight of the magnesium oxide content added and is subjected at 7 atmospheres pressure and at atmospheric temperature to the action of carbon dioxide gas which is passed in contact therewith. The aforementioned quantity of water is approximately sufficient to dissolve the magnesium oxide as a super-saturated solution of magnesium bicarbonate at the stated temperature and pressure. After the whole of the magnesium oxide has been dissolved the pressure is reduced to atmospheric pressure and the magnesium bicarbonate solution is filtered off the carbon, before any precipitation takes place. If the separated solution is then allowed to stand, approximately fifty per cent of the magnesium will automatically precipitate out as hydrated magnesium carbonate in about 30 minutes at 30° C. and is available for reuse. The solution of magnesium bicarbonate is then filtered off the precipitated hydrated magnesium carbonate and may be used for extracting further magnesium oxide from carbon under super-atmospheric pressure and in the presence of carbon dioxide gas.

The process of precipitating out the hydrated magnesium carbonate is greatly accelerated by heating the separated solution to 100° C. when approximately the whole of the magnesium is precipitated out on the solution reaching 100° C.

A second method of extracting the magnesium oxide from the carbon consists in passing carbon dioxide gas in contact with the carbon and magnesium oxide in water at normal pressure and temperature until the magnesium oxide is dissolved as a solution of magnesium bicarbonate, the magnesium bicarbonate solution is filtered off the carbon and is raised to a temperature of say 50° C. or other intermediate temperature between normal and 100° C. when approximately 50% (according to the temperature imparted) of the magnesium will precipitate out as hydrated magnesium carbonate which is available for re-use. The solution after precipitation is filtered off the precipitated hydrated magnesium carbonate and when cooled is available for extracting further magnesium oxide from carbon.

As an example carbon and magnesium oxide mixture from the retort has water approximately 80 times the weight of the magnesium oxide content added, carbon dioxide gas is passed in contact at normal pressure and temperature; this quantity of water is approximately sufficient to dissolve the magnesium oxide as a saturated solution of magnesium bicarbonate.

The magnesium bicarbonate solution is filtered off the carbon and is raised to approximately 50° C. when approximately 50% of the magnesium will precipitate out as hydrated magnesium carbonate which is available for re-use. The solution of magnesium bicarbonate remaining is filtered off the precipitated hydrated magnesium carbonate and is available after cooling for extracting further magnesium oxide from carbon. It will be realized that the temperature to which the filtered solution of magnesium bicarbonate is raised may be 100° C., in which case the precipitation of hydrated magnesium carbonate will be approximately complete.

Any combination of the foregoing methods may be used, such as extracting under high pressure of carbon dioxide and precipitating hydrated magnesium carbonate from the filtered magnesium bicarbonate solution at any intermediate temperature between normal and 100° C.

In referring to carbon dioxide gas as the agent of extraction it will be realized that commercial gases containing carbon dioxide may be used, such as flue gas from coke producers, lime kiln gas, etc.

As a certain small amount of magnesium bicarbonate may be lost in the filter cake or carbon, wastage of magnesium may conveniently be made up by calcining raw magnesite (magnesium carbonate) and making up wastage with the required amount of magnesium oxide.

What I claim as my invention and desire to secure by Letters Patent is:—

1. A process for the production of activated vegetable carbon which consists in intimately incorporating hydrated magnesium carbonate into carbonaceous material of vegetable origin, heating the mixture to a temperature such that the hydrated magnesium carbonate is dehydrated and decarbonated with resultant production of a highly activated carbon containing magnesium oxide, and thereafter treating the product to remove magnesium oxide therefrom.

2. A process for the production of activated vegetable carbon which consists in intimately incorporating hydrated magnesium carbonate into carbonaceous material of vegetable origin, heating the mixture to a temperature not substantially less than 1000° C. so that the hydrated magnesium carbonate is dehydrated and decarbonated with resultant production of a highly activated carbon containing magnesium oxide, maintaining the high temperature for a further short period after gases cease to be evolved to still further increase the activation, and thereafter treating the product to remove magnesium oxide therefrom.

3. A process for the production of activated vegetable carbon which comprises forming an intimately incorporated mixture of carbonaceous material of vegetable origin and a carbonate of a metal which forms a water soluble bicarbonate, carbonizing the mixture by heat, and eliminating the base of the carbonate by conversion into bicarbonate in the presence of water.

4. A process for the production of activated vegetable carbon which comprises forming an intimately incorporated mixture of carbonaceous material of vegetable origin and a carbonate of a metal which forms a water soluble bicarbonate, carbonizing the mixture by heat, converting the base of the carbonate into bicarbonate in the presence of water under pressure, and removing the resultant solution while still under pressure.

5. In a process for the production of activated vegetable carbon by heating an intimately incorporated mixture of carbonaceous material of vegetable origin and a hydrated carbonate of a metal forming a water-soluble bicarbonate, the recovery of the carbonate in hydrated form for re-use by converting the base of the carbonate into bicarbonate in the presence of water, removing the resultant solution and precipitating carbonate therefrom in hydrated form.

6. A process for the production of vegetable carbon which comprises intimately mixing carbonaceous material of vegetable origin with a calcinable salt of magnesium, heating the mixture to form carbon intimately mixed with magnesium oxide, carbonating the mixture in water so that the carbonate is dissolved as it is formed and separating the solution from the carbon.

7. A process for the production of vegetable carbon which comprises intimately mixing carbonaceous material of vegetable origin with a calcinable salt of magnesium, heating the mixture to form carbon intimately mixed with magnesium oxide, carbonating the mixture in water under superatmospheric pressure so that the carbonate is dissolved as it is formed and separating the solution from the carbon.

8. A process for the production of vegetable carbon which comprises intimately mixing carbonaceous material of vegetable origin with a calcinable salt of magnesium, heating the mixture to form carbon intimately mixed with magnesium oxide, carbonating the mixture in water under superatmospheric pressure so that the carbonate is dissolved as it is formed to produce a supersaturated solution, and separating the solution from the carbon while still under superatmospheric pressure.

9. A process for the production of vegetable carbon which comprises intimately mixing carbonaceous material of vegetable origin with a calcinable salt of magnesium, heating the mixture to form carbon intimately mixed with magnesium oxide, carbonating the mixture in water at normal atmospheric temperature so that the carbonate is dissolved as it is formed and separating the solution from the carbon.

10. A process for the production of vegetable carbon which comprises intimately mixing carbonaceous material of vegetable origin with a calcinable salt of magnesium, heating the mixture to form carbon intimately mixed with magnesium oxide, carbonating the mixture in water under superatmospheric pressure and at normal atmospheric temperature so that the carbonate is dissolved as it is formed and separating the solution from the carbon.

11. A process for the production of vegetable carbon which comprises intimately mixing carbonaceous material of vegetable origin with a calcinable salt of magnesium, heating the mixture to form carbon intimately mixed with magnesium oxide, carbonating the mixture in water under superatmospheric pressure and at normal atmospheric temperature so that the carbonate is dissolved as it is formed to produce a supersaturated solution, and separating the solution from the carbon while still under superatmospheric pressure.

In testimony whereof I affix my signature.

LEONARD HUGH BONNARD.